United States Patent
Okuno

(10) Patent No.: US 7,307,947 B2
(45) Date of Patent: Dec. 11, 2007

(54) PROTECTION SYSTEM, LAYER 2 FUNCTION BLOCK, NODE AND RING NETWORK ENABLING WIDEBAND TRANSMISSION OF WORKING TRAFFIC AND PROTECTION OF PROTECTION CHANNEL TRAFFIC

(75) Inventor: Eriko Okuno, Tokyo (JP)

(73) Assignee: NEC Corporation, Tokyo (JP)

( * ) Notice: Subject to any disclaimer, the term of this patent is extended or adjusted under 35 U.S.C. 154(b) by 1036 days.

(21) Appl. No.: 10/157,716

(22) Filed: May 29, 2002

(65) Prior Publication Data

US 2002/0181392 A1    Dec. 5, 2002

(30) Foreign Application Priority Data

May 30, 2001    (JP)    ............... 2001-163179

(51) Int. Cl.
G01R 31/08    (2006.01)
H04J 1/16    (2006.01)
H04L 1/00    (2006.01)
(52) U.S. Cl. ............ 370/222; 370/217; 370/219; 370/221; 370/223; 370/225; 370/228; 370/242; 370/249; 370/250
(58) Field of Classification Search ............ None
See application file for complete search history.

(56) References Cited

U.S. PATENT DOCUMENTS 5,333,130 A    7/1994    Weissmann et al.
5,986,783 A    11/1999    Sharma et al.
6,810,011 B1*    10/2004    Betts ................ 370/228
2002/0080437 A1*    6/2002    Sparks et al. ........... 359/110
2005/0244158 A1*    11/2005    Luft ..................... 398/59

FOREIGN PATENT DOCUMENTS

| EP | 1 128 584 A2 | 8/2001 |
| GB | 2 386 486 A | 9/2003 |
| JP | 11-168487 | 6/1999 |
| WO | WO 98/38829 | 9/1998 |
| WO | WO 00/07313 | 2/2000 |

* cited by examiner

Primary Examiner—Raj K Jain
(74) Attorney, Agent, or Firm—Scully, Scott, Murphy & Presser, P.C

(57) ABSTRACT

A ring network having a plurality of nodes connected by a working channel and a protection channel. When no failure exists, the working channel and the protection channel are link-aggregated into one virtual channel, and the transmission of the working traffic is carried out using both channels. When failure occurred to a line of the network, the link aggregation is suspended and a protection function in conjunction with the link aggregation is activated, in which a path avoiding the failure point is established by means of layer 1 protection process and thereafter data transmission is carried out by use of the path established by the layer 1 protection function. Therefore, data transmission in the no failure stated can be conduced using a bandwidth of twice as large as that of convention ring networks.

16 Claims, 10 Drawing Sheets

F I G. 7
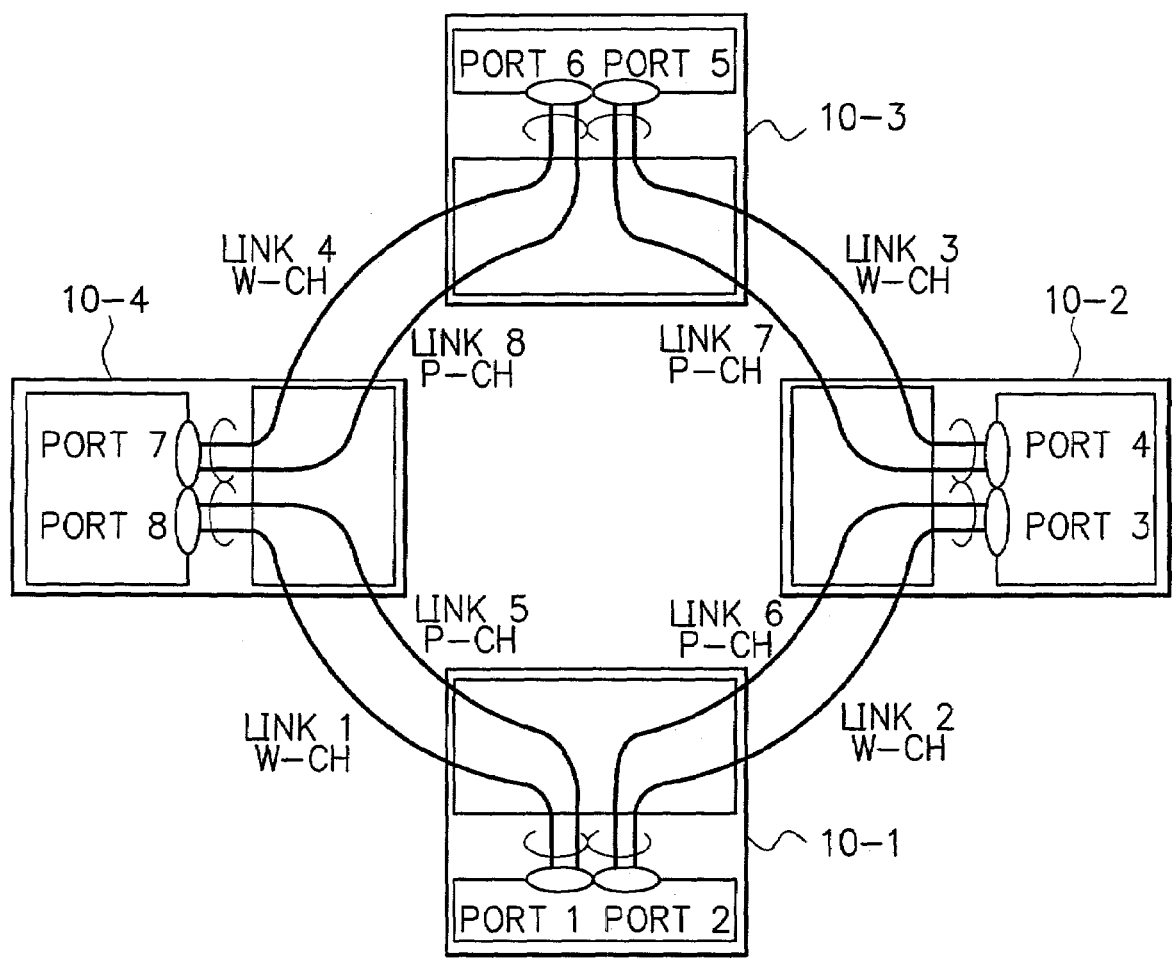

F I G. 8
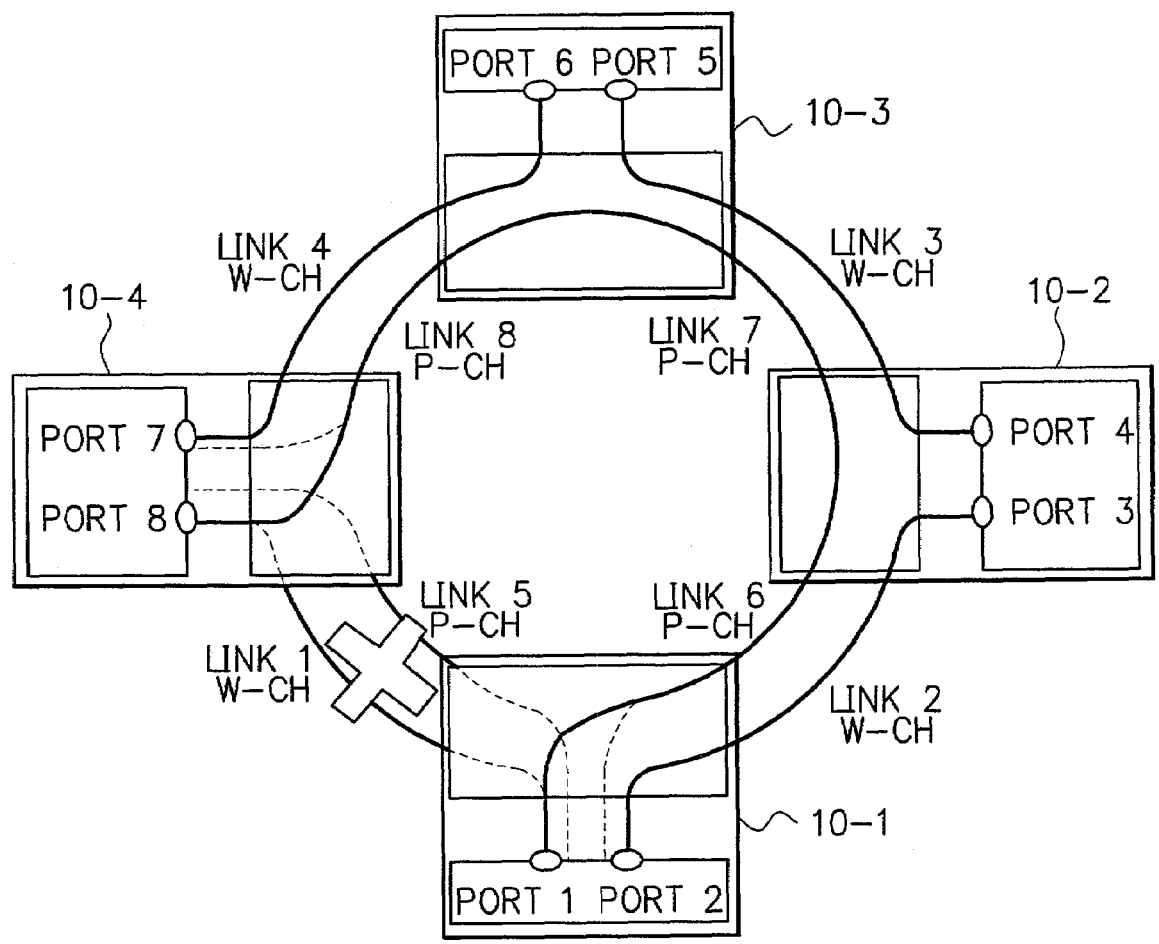

PROTECTION SYSTEM, LAYER 2 FUNCTION BLOCK, NODE AND RING NETWORK ENABLING WIDEBAND TRANSMISSION OF WORKING TRAFFIC AND PROTECTION OF PROTECTION CHANNEL TRAFFIC

BACKGROUND OF THE INVENTION

The present invention relates to a protection system, a layer 2 function block, a node and a ring network that are employed when the effective use of bandwidths (channels) is made by carrying out link aggregation in a ring network having a working channel and a protection channel, and in particular, to a protection system, a layer 2 function block, a node and a ring network by which traffic that is transmitted using the protection channel by means of the link aggregation when no failure exists in the network can also be transmitted when failure exists in the network, without abandoning the traffic.

DESCRIPTION OF THE RELATED ART

A ring network is constructed by connecting a plurality of nodes by transmission links in the shape of a ring. Some of such ring networks of today are provided with protection channels in order to provide for cases where failure occurred to the network. When failure occurred to the network, the channel being used is switched from the working channel to the protection channel and thereafter the working traffic is transmitted through the protection channel.

Examples of the ring network include BLSR (Bidirectional Line Switch Ring) and UPSR (Uni-directional Protection Switch Ring) of SONET/SDH (Synchronous Optical NETwork/Synchronous Digital Hierarchy).

In the BLSR, in which a plurality of nodes are connected by transmission lines in the shape of a ring, each two adjacent nodes are connected by two channels: a working channel and a protection channel. The nodes are connected together by the working channel when no failure exists in the network. When a failure occurred to a transmission line accommodating the working channel, a protection channel on another transmission line is thereafter used for the transmission of the traffic. Incidentally, it is also possible to implement bidirectional communication between two nodes by connecting the nodes by use of four channels: two working channels (for bidirectional communication) and two protection channels (for bidirectional communication).

FIG. 1 is a schematic diagram showing a concrete example of a BLSR network, and FIG. 2 is a schematic diagram showing an example of the so-called layer 1 protection process which is carried out when failure occurred to the BLSR network of FIG. 1. FIG. 1 shows a BLSR network enabling bidirectional communication, in which six nodes A-F are connected by links. In the network of FIG. 1, data is transmitted using two working channels 50A (solid lines) when no failure exists in the network. In the example of FIG. 1, a path for transmitting data from the node C to the node F via nodes D and E using the working channel 50A has been established.

When a failure occurred to a link between the nodes C and D as shown in FIG. 2, the nodes C and D that are directly connected to the failure link (link to which failure occurred) turn back all the paths so as to avoid the failure link. Concretely, in a normal link (link having no failure) that is connected to the node C (i.e. the link between the nodes C and B), the working channel 50A is turned back to a protection channel of the opposite data transmission direction. In a normal link that is connected to the node D (i.e. the link between the nodes D and E), the working channel 50A is turned back to a protection channel of the opposite data transmission direction. To sum up, each node (C, D) that is just upstream of the failure link turns back all the paths and thereby sets a new path (route) to the node at the end of the path (terminating node F).

Therefore, the data to be transferred from the node C to the node F is transmitted by the node C to the node D via the protection channel 50B which is shown in FIG. 2, turned back by the node D to the working channel 50A, and reaches the node F via the working channel 50A. Such process for turning back a channel so as to avoid the failure point is called "ring switch process".

FIG. 3 is a schematic diagram showing another example of the layer 1 protection process. When a failure occurred to the working channel 50A for transmitting data from the node D to the node E as shown in FIG. 3, a new path avoiding the working channel 50A is established by use of the protection channel 50B, that is, data transmission is carried out using a protection channel 50B (between the two nodes adjacent to the failure point) whose data transmission direction is the same as that of the working channel 50A (between the two nodes) to which the failure occurred. Such process is called "span switch process".

The aforementioned UPSR is a network in which a plurality of nodes are connected by transmission lines in the shape of a ring and two adjacent nodes are connected by two channels: a working channel (short or direct path between the two nodes) and a protection channel (long or detouring path between the two nodes). For example, unidirectional data transmission from a node A to a node B adjacent to the node A is carried out using the working channel (directly connecting the nodes A and B) and the protection channel (node A→node D→node C→node A, for example). It is also possible to realize bidirectional data transmission by connect the nodes by use of four channels: a first working channel, a second working channel of the opposite data transmission direction, a first protection channel, and a second protection channel of the opposite data transmission direction.

FIG. 4 is a schematic diagram showing an example of the operation of a UPSR network. In the example of FIG. 4, a channel whose data transmission direction is clockwise is defined as the working channel (working channel 51), and the other channel whose data transmission direction is counterclockwise is defined as the protection channel (protection channel 52). As mentioned above, it is also possible to implement bidirectional communication by connecting the nodes with four channels (two working channels for bidirectional communication and two protection channels for bidirectional communication).

When the node A sends data to the node C, the node A transmits the data to both the working channel 51 and the protection channel 52. When no failure exists in the working channel 51, the node C receives the data by selecting the working channel 51. When a failure occurred to the working channel 51, the node C selects the protection channel 52 and thereby receives the data.

However, such networks enabling the data transmission even in failure states by use of the protection channel are required to prepare and maintain double the bandwidth (channels) that is actually used for the data transmission. In other words, the protection channel is not actually used at all when no failure exists in the network. When a failure occurred, the working channel becomes usable. Therefore, the usage rate of the bandwidth of the network for the data transmission remains as low as 50%.

Meanwhile, there exists another type of ring network that uses the protection channel for transmitting an extra channel when no failure exists in the network. However, in such a network, the extra channel can not be protected when a failure occurred, since the protection channel has to be used for the transmission of the working traffic after the occurrence of the failure, not for the transmission of the extra channel. Therefore, the extra traffic is necessitated to be limited to traffic of lower priority than the working traffic.

SUMMARY OF THE INVENTION

It is therefore the primary object of the present invention to provide a protection system for being applied to a ring network having a plurality of nodes connected by a working channel and a protection channel, by which traffic can be transmitted using also the protection channel by means of the link aggregation function when no failure exists in the network, while enabling the transmission of the traffic (transmitted through the protection channel) even when failure occurred to the network.

Another object of the present invention is to provide a layer 2 function block which is installed in each node of a ring network having a plurality of nodes connected by a working channel and a protection channel, by which traffic can be transmitted using also the protection channel by means of the link aggregation function when no failure exists in the network, while protecting the traffic (transmitted through the protection channel) even when failure occurred to the network.

Another object of the present invention is to provide a node of a ring network having a plurality of nodes connected by a working channel and a protection channel, by which traffic can be transmitted using also the protection channel by means of the link aggregation function when no failure exists in the network, while protecting the traffic (transmitted through the protection channel) even when failure occurred to the network.

Another object of the present invention is to provide a ring network comprising a plurality of nodes connected by a working channel and a protection channel, by which traffic can be transmitted using also the protection channel by means of the link aggregation function when no failure exists in the network, while protecting the traffic (transmitted through the protection channel) even when failure occurred to the network.

In accordance with a first aspect of the present invention, there is provided a protection system for being applied to a ring network having a plurality of nodes connected by a working channel and a protection channel. In the protection system, working traffic is transmitted using both the working channel and the protection channel when no failure exists in the network, and the working traffic is transmitted using a path avoiding a point of failure that is established by means of layer 1 protection process when the failure occurred in the network.

In accordance with a second aspect of the present invention, in the first aspect, the layer 1 protection process includes ring switch process and span switch process.

In accordance with a third aspect of the present invention, there is provided a protection system for being applied to a ring network having a plurality of nodes connected by a working channel and a protection channel. In the protection system, working traffic is transmitted using a virtual channel generated by link-aggregating the working channel and the protection channel when no failure exists in the network. The working traffic is transmitted using a path that is established by means of layer 1 protection process avoiding a point of failure when the failure occurred in the network.

In accordance with a fourth aspect of the present invention, in the third aspect, the layer 1 protection process includes ring switch process and span switch process.

In accordance with a fifth aspect of the present invention, in the third aspect, the link aggregation of the working channel and the protection channel is carried out according to a link aggregation method defined by IEEE 802.3ad.

In accordance with a sixth aspect of the present invention, there is provided a layer 2 function block for being installed in each node of a ring network having a plurality of nodes connected by a working channel and a protection channel. The layer 2 function block carries out the transmission of working traffic using both the working channel and the protection channel when no failure exists in the network. The layer 2 function block carries out the transmission of the working traffic using a path avoiding a point of failure that is established by means of layer 1 protection process when the failure occurred in the network.

In accordance with a seventh aspect of the present invention, in the sixth aspect, the layer 2 function block includes failure information means and layer 2 connection control means. The failure information means receives failure information (indicating the state of failure occurring in the network and failure recovery information (indicating the recovery of the network) from the failure from the layer 1, and issues port selection instructions based on the failure information and the failure recovery information. The layer 2 connection control means controls the connections between the layer 1 and upper layers by controlling its ports based on the port selection instruction supplied from the failure information means.

In accordance with an eighth aspect of the present invention, in the sixth aspect, the layer 1 protection process includes ring switch process and span switch process.

In accordance with a ninth aspect of the present invention, there is provided a layer 2 function block for being installed in each node of a ring network having a plurality of nodes connected by a working channel and a protection channel. The layer 2 function block carries out the transmission of working traffic using a virtual channel generated by link-aggregating the working channel and the protection channel when no failure exists in the network. The layer 2 function block carries out the transmission of the working traffic using a path avoiding a point of failure that is established by means of layer 1 protection process when the failure occurred in the network.

In accordance with a tenth aspect of the present invention, in the ninth aspect, the layer 2 function block includes failure information means and layer 2 connection control means. The failure information means receives failure information (indicating the state of failure occurring in the network) and failure recovery information (indicating the recovery of the network) from the failure from the layer 1, and issues port selection instructions based on the failure information and the failure recovery information. The layer 2 connection control means controls the connections between the layer 1 and upper layers by controlling its ports based on the port selection instruction supplied from the failure information means.

In accordance with an eleventh aspect of the present invention, in the ninth aspect, the layer 1 protection process includes ring switch process and span switch process.

In accordance with a twelfth aspect of the present invention, in the ninth aspect, the layer 2 function block carries out the link aggregation of the working channel and the protection channel according to a link aggregation method defined by IEEE 802.3ad.

In accordance with a thirteenth aspect of the present invention, there is provided a node of a ring network having a plurality of nodes connected by a working channel and a protection channel. The node comprises a layer 1 function block and a layer 2 function block. The layer 1 function block carries out layer 1 protection process when failure occurred in the network and thereby establishes a path avoiding a point of the failure. The layer 2 function block carries out the transmission of working traffic using both the working channel and the protection channel when no failure exists in the network, while carrying out the transmission of the working traffic using the path established by the layer 1 function block when the failure occurred in the network.

In accordance with a fourteenth aspect of the present invention, in the thirteenth aspect, the layer 2 function block includes failure information means and layer 2 connection control means. The failure information means receives failure information (indicating the state of failure occurring in the network) and failure recovery information (indicating the recovery of the network from the failure) from the layer 1 function block, and issues port selection instructions based on the failure information and the failure recovery information. The layer 2 connection control means controls the connections between the layer 1 function block and upper layers by controlling its ports based on the port selection instruction supplied from the failure information means.

In accordance with a fifteenth aspect of the present invention, in the thirteenth aspect, the layer 1 protection process executed by the layer 1 function block includes ring switch process and span switch process.

In accordance with a sixteenth aspect of the present invention, there is provided a node of a ring network having a plurality of nodes connected by a working channel and a protection channel. The node comprises a layer 1 function block and a layer 2 function block. The layer 1 function block carries out layer 1 protection process when failure occurred in the network and thereby establishes a path avoiding a point of the failure. The layer 2 function block carries out the transmission of working traffic using a virtual channel generated by link-aggregating the working channel and the protection channel when no failure exists in the network, while carrying out the transmission of the working traffic using the path established by the layer 1 function block when the failure occurred in the network.

In accordance with a seventeenth aspect of the present invention, in the sixteenth aspect, the layer 2 function block includes failure information means and layer 2 connection control means. The failure information means receives failure information (indicating the state of failure occurring in the network) and failure recovery information (indicating the recovery of the network from the failure) from the layer 1 function block, and issues port selection instructions based on the failure information and the failure recovery information. The layer 2 connection control means controls the connections between the layer 1 function block and upper layers by controlling its ports based on the port selection instruction supplied from the failure information means.

In accordance with an eighteenth aspect of the present invention, in the sixteenth aspect, the layer 1 protection process executed by the layer 1 function block includes ring switch process and span switch process.

In accordance with a nineteenth aspect of the present invention, in the sixteenth aspect, the layer 2 function block carries out the link aggregation of the working channel and the protection channel according to a link aggregation method defined by IEEE 802.3ad.

In accordance with a twentieth aspect of the present invention, there is provided a ring network comprising a plurality of nodes connected by a working channel and a protection channel. In the ring network, the node includes: a layer 1 function block for carrying out layer 1 protection process when failure occurred in the network and thereby establishing a path avoiding a point of the failure; and a layer 2 function block for carrying out the transmission of working traffic using both the working channel and the protection channel when no failure exists in the network, while carrying out the transmission of the working traffic using the path established by the layer 1 function block when the failure occurred in the network.

In accordance with a twenty-first aspect of the present invention, in the twentieth aspect, the layer 2 function block includes failure information means and layer 2 connection control means. The failure information means receives failure information (indicating the state of failure occurring in the network) and failure recovery information (indicating the recovery of the network from the failure) from the layer 1 function block, and issues port selection instructions based on the failure information and the failure recovery information. The layer 2 connection control means controls the connections between the layer 1 function block and upper layers by controlling its ports based on the port selection instruction supplied from the failure information means.

In accordance with a twenty-second aspect of the present invention, in the twentieth aspect, the layer 1 protection process executed by the layer 1 function block includes ring switch process and span switch process.

In accordance with a twenty-third aspect of the present invention, there is provided a ring network comprising a plurality of nodes connected by a working channel and a protection channel. In the ring network, the node includes: a layer 1 function block for carrying out layer 1 protection process when failure occurred in the network and thereby establishing a path avoiding a point of the failure; and a layer 2 function block for carrying out the transmission of working traffic using a virtual channel generated by link-aggregating the working channel and the protection channel when no failure exists in the network, while carrying out the transmission of the working traffic using the path established by the layer 1 function block when the failure occurred in the network.

In accordance with a twenty-fourth aspect of the present invention, in the twenty-third aspect, the layer 2 function block includes failure information means and layer 2 connection control means. The failure information means receives failure information (indicating the state of failure occurring in the network) and failure recovery information (indicating the recovery of the network from the failure) from the layer 1 function block, and issues port selection instructions based on the failure information and the failure recovery information. The layer 2 connection control means controls the connections between the layer 1 function block and upper layers by controlling its ports based on the port selection instruction supplied from the failure information means.

In accordance with a twenty-fifth aspect of the present invention, in the twenty-third aspect, the layer 1 protection process executed by the layer 1 function block includes ring switch process and span switch process.

In accordance with a twenty-sixth aspect of the present invention, in the twenty-third aspect, the layer 2 function block carries out the link aggregation of the working channel and the protection channel according to a link aggregation method defined by IEEE 802.3ad.

BRIEF DESCRIPTION OF THE DRAWINGS

The objects and features of the present invention will become more apparent from the consideration of the following detailed description taken in conjunction with the accompanying drawings, in which:

FIG. 7 is a schematic diagram showing the composition of the ring network of the first embodiment;

FIG. 8 is a schematic diagram showing an example of a ring switch process which is carried out in the ring network of FIG. 7;

DESCRIPTION OF THE PREFERRED EMBODIMENTS

Figure 1:
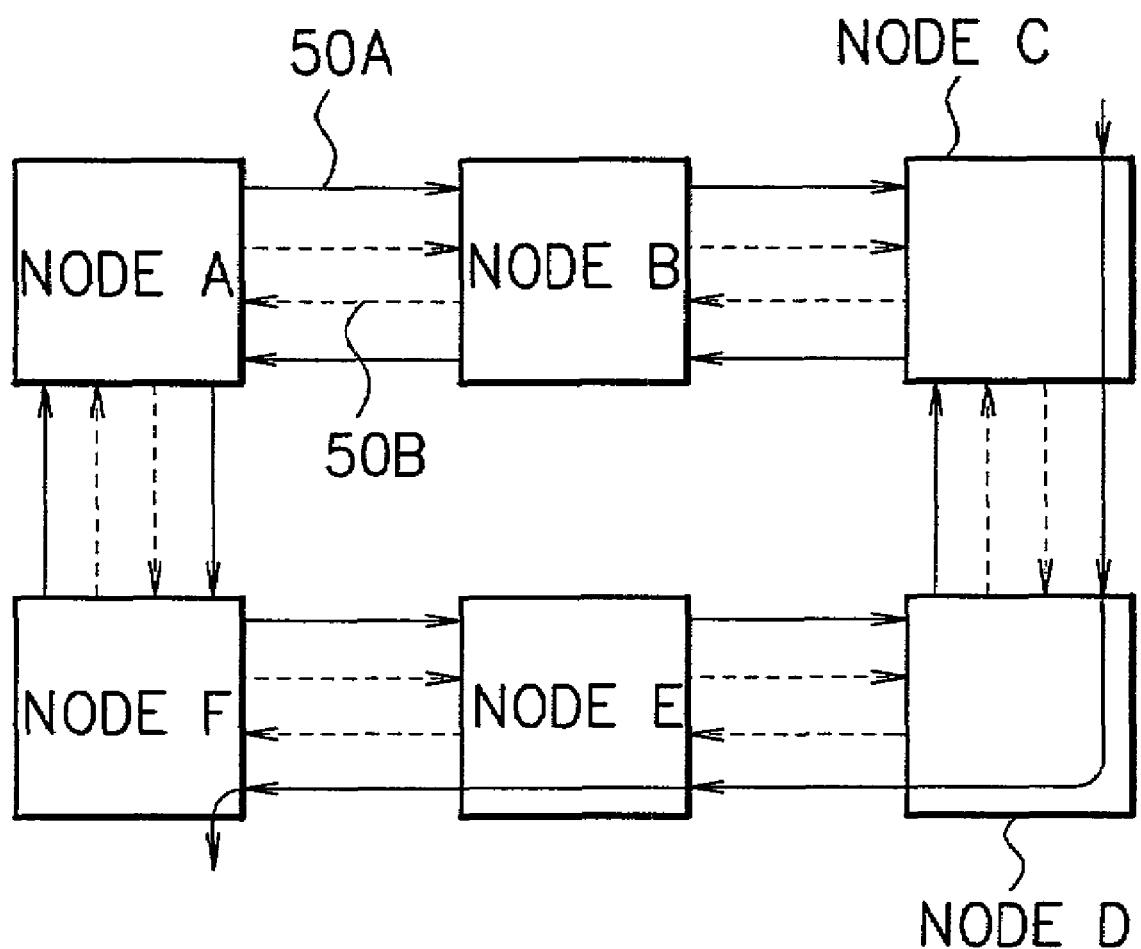
FIG. 1 is a schematic diagram showing an example of a BLSR network.
Figure 2:
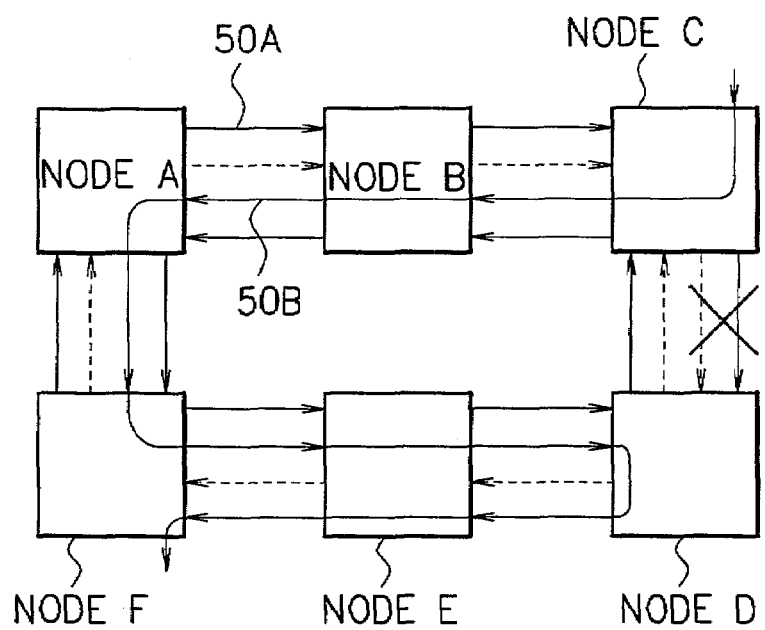
FIG. 2 is a schematic diagram showing an example of the so-called layer 1 protection process (ring switch process) which is carried out when failure occurred to the BLSR network of FIG. 1.

Referring now to the drawings, a description will be given in detail of preferred embodiments in accordance with the present invention.

First, an outline of a protection system, a layer 2 function block, a node and a ring network in accordance with the present invention will be described briefly.

<Protection System>

The protection system in accordance with the present invention is applied to a ring network having a plurality of nodes which are connected by a working channel and a protection channel.

When no failure exists in the network (in "no failure state"), the working channel and the protection channel are link-aggregated so as to be used as one virtual "working" channel (link aggregation function), thereby working traffic is transmitted using both the working channel and the protection channel.

When failure occurred to the network (in "failure state"), the link aggregation is suspended and a protection function in conjunction with the link aggregation function is activated, in which a path (route, network) avoiding a point of the failure (hereafter, referred to as "failure point") is established by means of a layer 1 protection function and thereafter data transmission is carried out by use of connection to the path established by the layer 1 protection function.

Therefore, in the failure state, the path (route, network) established by the layer 1 protection function so as to avoid the failure point is connected with the upper layer for data transmission. Traffic that is transmitted through the working channel and the protection channel by means of the link aggregation in the no failure state (working traffic) is transmitted using the path established by the layer 1 protection function in the failure state, thereby the traffic which is passed through the protection channel by means of the link aggregation in the no failure state can be protected in the failure state.

<Layer 2 Function Block>

The layer 2 function block in accordance with the present invention, which is installed in each node of a ring network having a plurality of nodes which are connected by a working channel and a protection channel, realizes the aforementioned protection function in conjunction with the link aggregation function.

In the no failure state, the layer 2 function block link-aggregates the working channel and the protection channel and thereby carried out data transmission, that is, both the working channel and the protection channel are used for data transmission.

In the failure state, the layer 2 function block suspends the link aggregation as necessary, selects the path established by the layer 1 protection function avoiding the failure point, and transmits/receives the traffic (that is transmitted through the working channel and the protection channel in the no failure state (working traffic)) through the path.

Therefore, by the layer 2 function block of the present invention, in a ring network having a working channel and a protection channel, the transmission of the working traffic is carried out by link-aggregating the working channel and the protection channel in the no failure state, while the transmission of the working traffic in the failure state is carried out by use of the path established by the layer 1 protection function, thereby the transmission of the working traffic (traffic to be protected/traffic of high priority) through the protection channel in the no failure state is made possible. In other words, the protection channel can be used for the transmission of high-priority traffic in the no failure state.

<Node>

The node in accordance with the present invention, which is used in a ring network having a working channel and a protection channel, includes the layer 2 function block which is capable of conducting data transmission using the above protection system. The node receives data from the upper layer, outputs the data to the ring network by use of the layer 2 function block and thereby transmits the data to a receiving node to which a destination device is connected.

Therefore, in the no failure state, the node transmits data using also the protection channel by means of the link aggregation process. In the failure state, the traffic that used to be passed through the protection channel in the no failure state can also be protected (as well as the traffic that used to be passed through the working channel in the no failure state).

In short, the working channel and the protection channel are handled as one virtual channel by means of the link aggregation process and the aggregated channel is used for the transmission of the traffic, also enabling the protection of the traffic.

<Ring Network>

The ring network in accordance with the present invention is constructed by connecting a plurality of such nodes by links including working channels and protection channels.

Therefore, in the ring network, data transmission in the no failure state is conducted using the protection channel as well as the working channel by means of the link aggregation process. In the failure state, data transmission is carried out using the path that is established by the layer 1 protection function avoiding the failure point, thereby the protection of the traffic (that is passed through the protection channel in the no failure state) is made possible.

By such operation of the ring network, data transmission in the no failure state can be conducted using a bandwidth (transmission capacity, channels) of twice as large as that of the conventional ring network (which divides its channel resources into the working channel and the protection channel and uses the working channel for data transmission in the no failure state). Further, differently from the conventional ring network (which abandons the extra traffic (passed through the protection channel in the no failure state) when failure occurred), the protection of traffic that is passed through the protection channel in the no failure state (as well as the protection of traffic that is passed through the working channel in the no failure state) is made possible.

Figure 5:
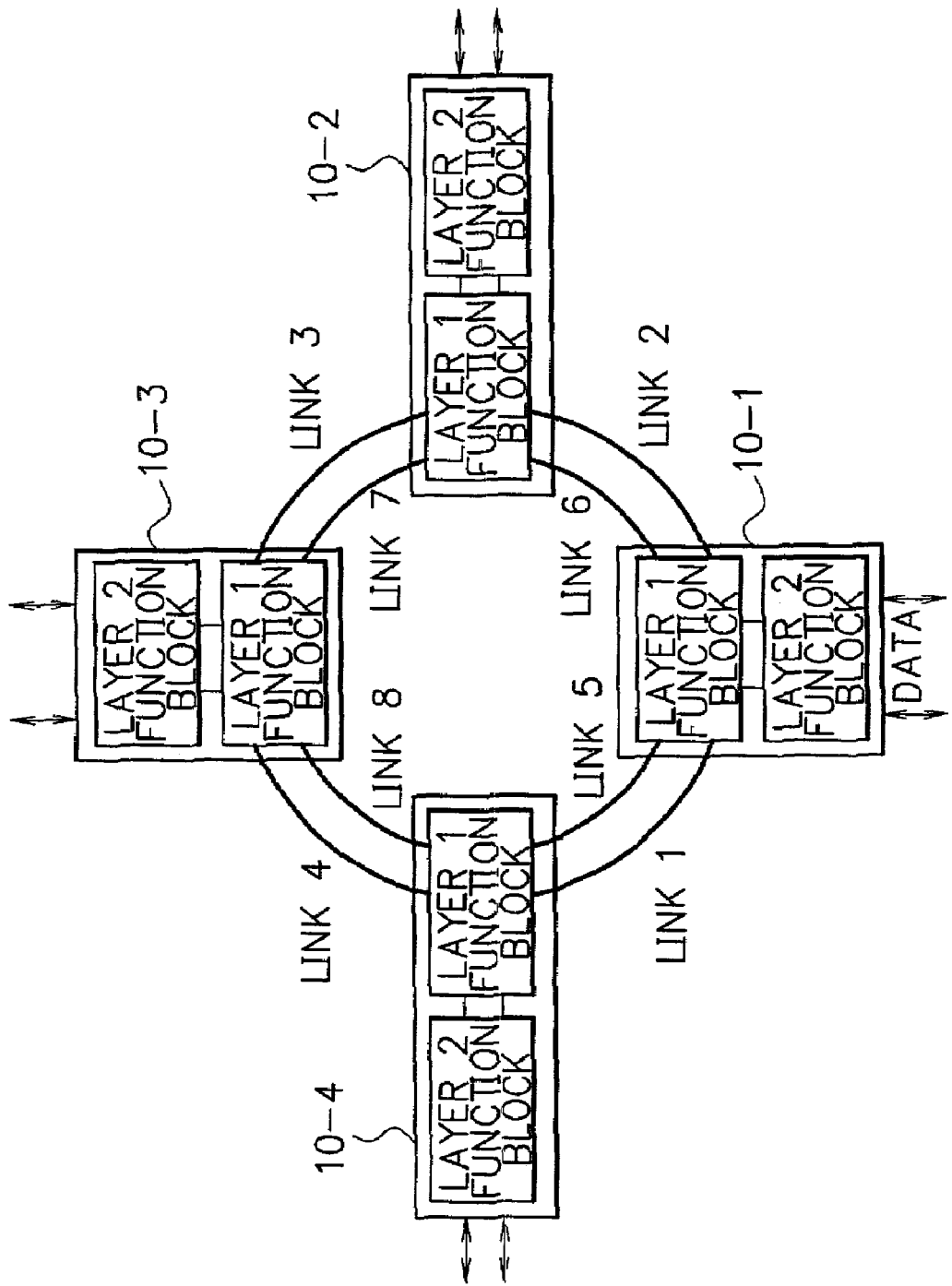
FIG. 5 is a schematic diagram showing an example of a ring network, in which four nodes 10-1-10-4 are connected by links in the shape of a ring.

FIG. 5 is a schematic diagram showing an example of a ring network, in which four nodes 10-1-10-4 are connected by links in the shape of a ring. In the example of FIG. 5, the links include a link 1 connecting the nodes 10-4 and 10-1, a link 2 connecting the nodes 10-1 and 10-2, a link 3 connecting the nodes 10-2 and 10-3, a link 4 connecting the nodes 10-3 and 10-4, a link 5 connecting the nodes 10-4 and 10-1, a link 6 connecting the nodes 10-1 and 10-2, a link 7 connecting the nodes 10-2 and 10-3, and a link 8 connecting the nodes 10-3 and 10-4.

Such a ring network can be implemented as either a 2-fiber ring network or a 4-fiber ring network. In both cases, the nodes are connected together by four channels (two working channels and two protection channels). In the 2-fiber ring network, adjacent two nodes are connected by two fiber optic cables. The transmission capacity of a fiber optic cable is divided into equal halves to be used as the working channel and the protection channel. Therefore, in the 2-fiber ring network, each link shown in FIG. 5 is implemented by a fiber optic cable.

In the 4-fiber ring network, adjacent two nodes are connected by four fiber optic cables (two lines (fibers) for the working channels and two lines (fibers) for the protection channels). Therefore, in the 4-fiber ring network, each link shown in FIG. 5 is implemented by two fiber optic cables (two lines for bidirectional communication).

In the following, preferred embodiments of the ring network showing in FIG. 5 will be explained in detail, in which a protection system, a layer 2 function block and a node in accordance with the present invention will also be explained in detail.

Embodiment 1

A ring network in accordance with the first embodiment of the present invention employs the 4-fiber ring, in which the links 1-4 shown in FIG. 5 are used as the working channels, and the links 5-8 are used as the protection channels. As the layer 1 protection function, BLSR is employed.

<Node>

Figure 6:
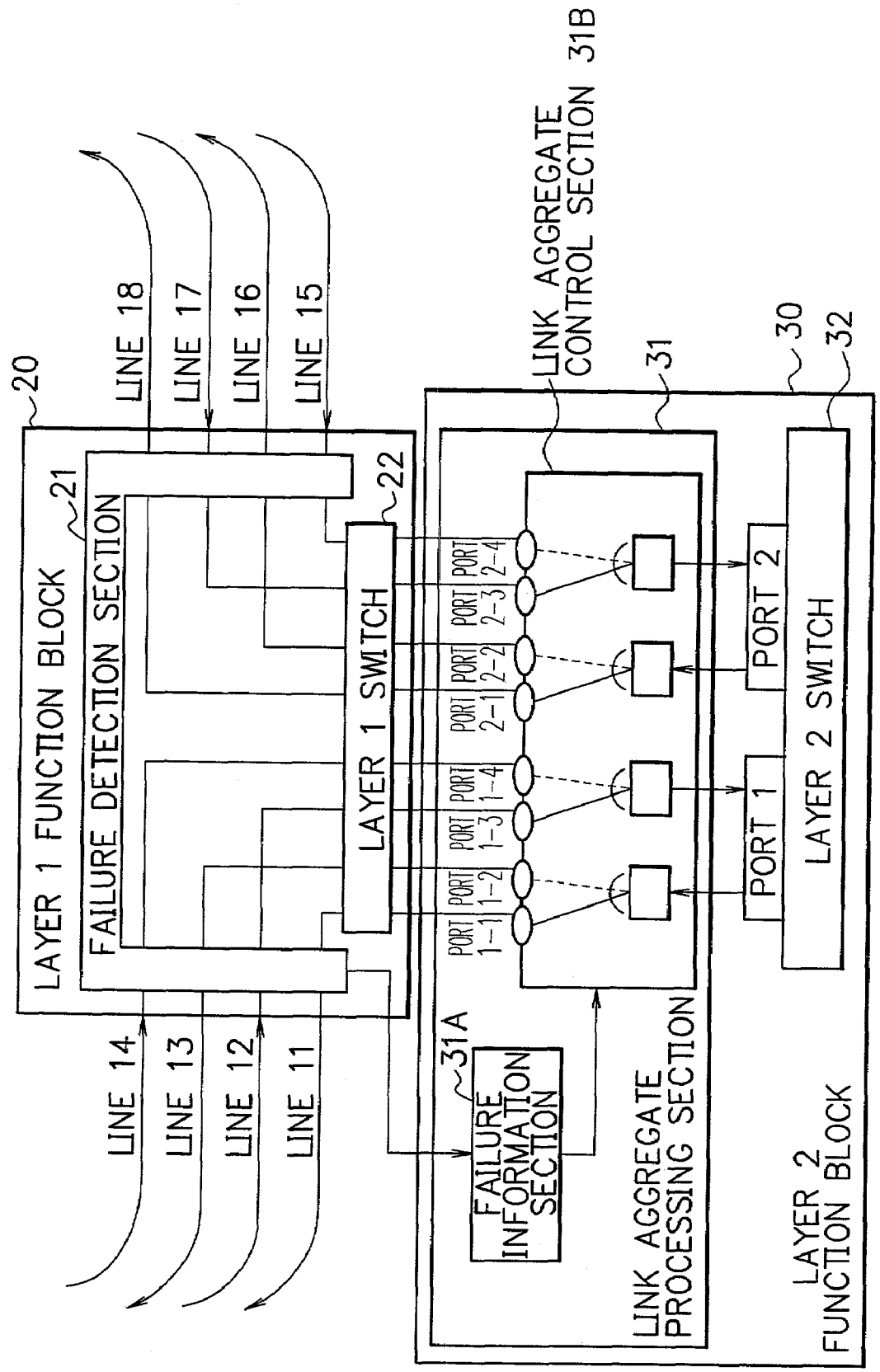
FIG. 6 is a block diagram showing an example of the composition of a node of a ring network in accordance with a first embodiment of the present invention.

FIG. 6 is a block diagram showing an example of the composition of the node 10 (10-1) of the ring network of the first embodiment. As shown in FIG. 6, the node 10 includes a layer 1 function block (ring equipment) 20 and a layer 2 function block 30. In the case of the node 10-1 which is shown in FIG. 5, the lines (channels) 11 and 12 correspond to the link 1 (shown in FIG. 5), the lines 15 and 16 correspond to the link 2, the lines 13 and 14 correspond to the link 5, and the lines 17 and 18 correspond to the link 6. Therefore, the lines 11, 12, 15 and 16 are the working channels, and the lines 13, 14, 17 and 18 are the protection channels.

<Layer 1 Function Block 20>

As shown in FIG. 6, the layer 1 function block 20 connects four SONET/SDH links (transmission lines, fiber cables) to the layer 2 function block 30, and transmits data that are supplied from the layer 2 function block 30 to an appropriate link by use of a layer 1 switch 22. Therefore, the layer 1 function block 20 has the function of the layer 1 of the OSI reference model (OSI 7-layer model), The layer 1 function block 20 is also provided with a failure detection section 21, therefore, the layer 1 function block 20 also has a ring protection function on the layer 1 level (hereafter, referred to as "layer 1 protection function").

The layer 1 protection function is a function for generating or establishing a network (path) avoiding a point (line/link) where failure is detected (failure point) when the failure is detected by the failure detection section 21. In this embodiment, BLSR is employed for the layer 1 protection function. Incidentally, the layer 1 protection function is different from a protection function of the present invention (protection function of the layer 2 function block 30). Therefore, when an expression "protection function" or "protection process" is used in this document, the expression basically does not include the "layer 1 protection function/process".

The failure detection section 21 detects a failure occurring on the lines 11-18. When a failure on a line is detected, the failure detection section 21 sends failure information to the layer 1 switch 22 and a link aggregate processing section 31 (failure information section 31A) of the layer 2 function block 30. When recovery of the line from the failure is detected, the failure detection section 21 sends failure recovery information to the layer 1 switch 22 and the link aggregate processing section 31. The failure detection and failure recovery detection can be carried out by means of well known methods.

When the failure detection section 21 detected a failure on the network, the layer 1 switch 22 executes the layer 1 ring protection process.

When failure occurred to a link between adjacent two nodes and both the working channel and the protection channel between the nodes are unusable at least in one data transmission direction, the so-called "ring switch process" is carried out, since BLSR is employed in this embodiment. In other words, if failure occurred to both the working channel and the protection channel in a data transmission direction between two nodes, the turn-back process is carried out so as to avoid the failure point (line/channel/link) and thereby a path avoiding the failure point is established. Concretely, if a failure occurred to a line on the upstream side of a node, the layer 1 switch 22 of the node connects the input working channel on the downstream side to the output protection channel on the downstream side.

Also when the data transmission is disabled in both data transmission direction between two nodes, the layer 1 switch 22 executes the ring switch process so as to avoid the failure point (lines).

When failure occurred to a link between adjacent two nodes and at least the working channel or the protection channel can be used in each data transmission direction, the "span switch process" is carried out. In other words, if at least one of the working channel and the protection channel can be used in each data transmission directions between two nodes, the use of the channel having the failure is stopped and thereafter the other channel in the same data transmission direction having no failure is used. Therefore, a node just upstream (in the data transmission direction of the failure channel) of the failure channel transmits data using the other channel of the same data transmission direction. A node just downstream of the failure channel receives the data via the other channel.

Incidentally, even when the failure point can be avoided by means of the span switch process, it is also possible to let the layer 1 switch 22 carry out the ring switch process.

When lines from the node 10-1 to the node 10-4 are totally broken (failure on the lines 11 and 13) or lines from the node 10-4 to the node 10-1 are totally broken (failure on the lines 12 and 14), the nodes 10-1 and 10-4 carry out the ring switch process. The nodes 10-1 and 10-4 can not use the lines 11 and 13 shown in FIG. 6, therefore, data outputted from the port 1 of the layer 2 switch 32 are connected to the line 18 and are transmitted to the line 18. If the nodes 10-1 and 10-4 can not use the lines 12 and 14 shown in FIG. 6, data to be supplied to the port 1 of the layer 2 switch 32 are received from the line 17 and inputted to the port 1. Thereby, a network (path/route) avoiding the failure point by means of the ring switch process is established as shown in FIG. 8.

When at least a channel for transmitting data from the node 10-1 to the node 10-4 and at least a channel for transmitting data from the node 10-4 to the node 10-1 are usable, the nodes 10-1 and 10-4 carry out the span switch process. In this case, the node 10-1 can use at least one of the lines (channels) 11 and 13 for transmitting data to the node 10-4 and one of the lines (channels) 12 and 14 for receiving data from the node 10-4. If we assume that the failure occurred to the line (channel) 11 for transmitting data to the node 10-4, the node 10-1 conducts the data transmission to the node 10-4 by use of the other line 13 of the same data transmission direction. The node 10-4 makes settings of itself so as to receive data from the node 10-1 by use of the line 13 having no failure.

<Layer 2 Function Block 30>

The layer 2 function block 30 includes the link aggregate processing section 31 and a layer 2 switch 32 and thereby realizes the function of an ordinary layer 2 function block (MAC function etc.) and the aforementioned protection function (including the link aggregation function).

As the MAC function, the function defined by IEEE (Institute of Electrical and Electronics Engineers) 802.3 can be employed for example. The "link aggregation" is a technique for bundling two or more links up and handling the bundled links as a link. As the link aggregation function, the function defined by IEEE 802.3ad can be employed for example.

The link aggregate processing section 31 includes the failure information section 31A and a link aggregate control section 31B.

The failure information section 31A sends a port selection instruction to the link aggregate control section 31B based on the failure information and the failure recovery information supplied from the failure detection section 21.

The link aggregate control section 31B includes ports 1-1-1-4 and 2-1-2-4 for connecting with the layer 1 switch 22, and thereby realizes data transmission by connecting the upper layer (upper layer device) and the paths (lines 11-18/channels) which are established by the layer 1 switch 22.

When no failure has occurred, the link aggregate control section 31B link-aggregates the working channel (line) and the protection channel (line) of the same data transmission direction, that is, receives data from the upper layer and transmits the data using the working channel and the protection channel of the same data transmission direction for the data. Meanwhile, the link aggregate control section 31B receives data from the working channel and the protection channel of the same data transmission direction and reassembles the data into the original data (data row at the transmitting node).

When failure occurred, the data transmission/reception is carried out by use of the paths (channels) that are established by the layer 1 protection process by the layer 1 switch 22. Therefore, data inputted from the upper layer are forwarded to a path (channel for the transmission of the data) selected out of the paths which are established by the layer 1 protection function on the occurrence of the failure. On the other hand, data that are received via the layer 1 switch 22 in the failure state are supplied to the upper layer.

Incidentally, the link aggregate control section 31B is capable of obtaining information on the type of the path established by the layer 1 protection function (whether the path has been established by the ring switch process or the span switch process, which links (paths) have been set for data transmission/reception, etc.) from the layer 1 switch 22, for example. If the types of paths that should be set are predetermined for each failure information indicating the state of the failure, it is also possible to let the link aggregate control section 31B judge the types of the established paths based on the failure information and the settings. Such predetermined settings can include the following examples.

① . If the failure point can be avoided by the span switch process, the span switch process should be executed. If the failure point can not be avoided by the span switch process, the ring switch process should be executed.

② If failure occurred to a link, the ring switch process (turn-back process) should be executed regardless of the state of the failure.

③ In addition to ①, when the span switch process is executed for channels of a data transmission direction between two nodes, the span switch process should be executed also for the other channels of the opposite data transmission direction between the nodes.

④ In addition to ① or ③, when the span switch process is executed for lines (working channel & protection channel) of a data transmission direction, the span switch process should be executed also for other lines (working channels & protection channels) of the same data transmission direction, that is, data transmission in the data transmission direction should be carried out using only the working channel or the protection channel also between other nodes (than the nodes adjacent to the failure point).

⑤ In addition to ④, data transmission between nodes should be carried out using only the working channel or the protection channel also in the other data transmission direction.

In the following, the operation of the link aggregate control section 31B will be described in detail.

<No Failure State>

When no failure has occurred, if data to be outputted to a path (links shown in FIG. 5) of the clockwise data transmission direction is supplied from the upper layer, the link aggregate control section 31B of the node 10-1 shown in FIG. 6 outputs the data to the lines 11 and 13 through the ports 1-1 and 1-2. In other words, when data is transmitted by the node 10-1 to the direction of the node 10-4, the working channel (line 11) and the protection channel (line 13) of the data transmission direction are link-aggregated and a virtual channel generated by the link aggregation is used for data transmission.

Meanwhile, if data to the node 10-1 is supplied from a path (links shown in FIG. 5) of the counterclockwise data transmission direction (lines 12 and 14), the link aggregate control section 31B receives the data via the ports 1-3 and 1-4 corresponding to the path, reassembles the received data to the original data row, and outputs the data row to the upper layer through the port 1 of the layer 2 switch 32.

As mentioned above, when no failure exists, the layer 2 function block 30 of a transmitting node (i.e. a node transmitting data to the node 10-1) transmits data by link-aggregating the working channel and the protection channel for the data transmission to the node 10-1. Therefore, the data is inputted to the node 10-1 through the line 12 as the working channel and the line 14 as the protection channel. The node 10-1 obtains the data via the port 1-3 which is connected to the line 12 and the port 1-4 which is connected to the line 14, and reassembles the received data to the original data row.

Incidentally, the "original data row" means a data row which was inputted to the link aggregate control section 31B of the transmitting node by an upper layer device, that is, a data row before the link aggregation by the link aggregate control section 31B of the transmitting node. The reassembling of data into the original data row can be carried out by means of well known methods.

For data communication with the node 10-2 in the no failure state, the link aggregate control section 31B of the node 10-1 connects the output of the port 2 of the layer 1 switch 22 to the ports 2-1 and 2-2 (lines 16 and 16), and connects the input from the ports 2-3 and 2-4 (lines 17 and 15) to the port 2 of the layer 1 switch 22, similarly to the above explanation.

<Failure State #1>

In the following, the operation of the link aggregate control section 31B when failure occurred to the network will be explained. First, a case where both the working channel and the protection channel in at least one data transmission direction between the nodes 10-1 and 10-4 are totally disabled will be taken as an example.

In this case, the layer 1 switches 22 of the nodes 10-1 and 10-4 carry out the ring switch process so as to avoid the failure point (failure links).

Concretely, the layer 1 switch 22 of the node 10-1 makes connections so that data output from the port 1 of the layer 2 switch 32 so as to be transmitted to the node 10-4 will be transmitted to the protection channel (line 18), while making connections so that data transmitted from the node 10-4 through the protection channel (line 17) will be inputted to the port 1 of the layer 2 switch 32. FIG. 8 illustrates an example of the ring switching process which is carried out on the ring network depicted in FIG. 7. Therefore, as shown in FIG. 8, data transmission between the node 10-4 and 10-3, between the nodes 10-3 and 10-2 and between the nodes 10-2 and 10-1 is carried out bidirectionally by use of the working channels (links 2, 3 and 4). Data transmission between the node 10-1 and 10-4 is carried out birdictionally by use of the protection channels (links 6, 7 and 8).

Figure 9:
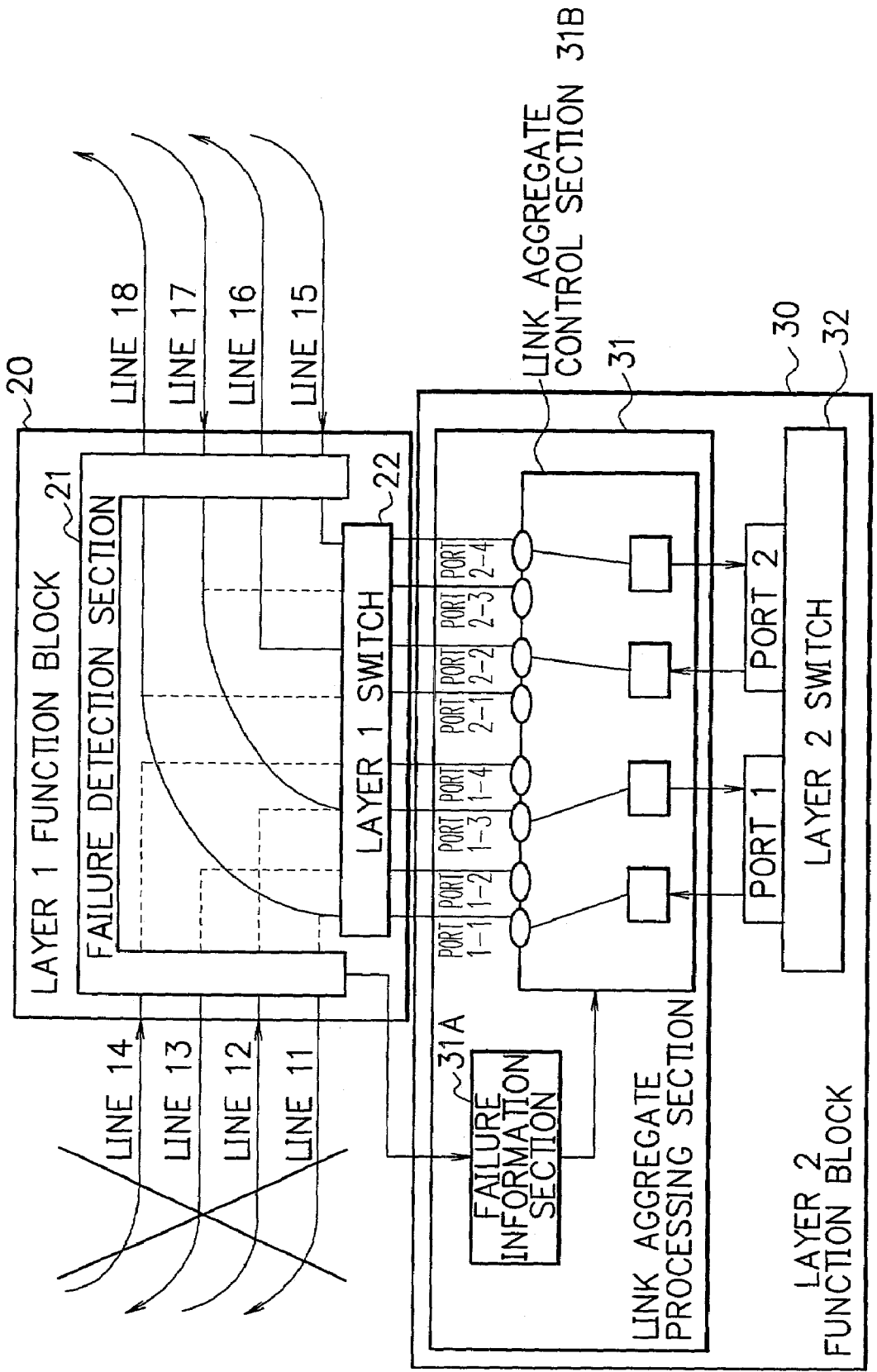
FIG. 9 is a schematic diagram showing the operation of the node of FIG. 6 when failure occurred to lines connected to the node.

Therefore, when the node 10-1 communicates data with the node 10-2, the link 2 is used. As shown in FIG. 9, the link aggregate control section 31B of the node 10-1 is connected with the line 15 by its port 2-4 in order to receive data from the node 10-2, and sends the received data to the upper layer through the port 2 of the layer 2 switch 32. The link aggregate control section 31B is also connected with the line 16 (working channel for transmitting data to the node 10-2) by its port 2-2, receives data to be transmitted to the node 10-2 from the upper layer, and transmits the data to the line 16.

The port 1-3 of the link aggregate control section 31B of the node 10-1 is connected with the line 17 in order to receive data that are transmitted from the node 10-4 to the node 10-1, and the received data is sent to the upper layer. The link aggregate control section 31B is also connected with the line 18 (protection channel for transmitting data to the node 10-4) by its port 1-1, receives data to be transmitted to the node 10-4 from the upper layer, and transmits the data to the line 18.

The node 10-4 also carries out the ring switch process in a similar manner. Therefore, the link aggregate control section 31B of the node 10-4 connects the upper layer of the node 10-4 with the paths (lines/channels) that are used during the ring switch process, similarly to the link aggregate control section 31B of the node 10-1.

In the case where the ring network is operated by use of the paths for the ring switch process, paths that should be used for data transmission/reception are also set to each of other nodes (10-2, 10-3). Therefore, the link aggregate control section 31B of each node connects with specific paths selected out of the paths which are established by the layer 1 protection process and thereby executes data transmission/reception.

In short, when failure occurred to the network, the link aggregate process is ended and the port 1 and 2 of the layer 2 switch 32 are connected with lines (lines 15 -18 in this example) that are usable during the ring protection process. Thereafter, the traffic is transmitted using the usable lines.

<Failure State #2>

Next, a case where failure occurred to a working channel of a data transmission direction from the node 10-1 to the node 10-4 (line 11 shown in FIG. 6) is taken as an example. In this case, the layer 1 switch 22 of the nodes 40-1 and 10-4 carry out a layer 1 protection process (span switch process, ring switch process, etc. for avoiding the failure point (failure link)).

Figure 3:
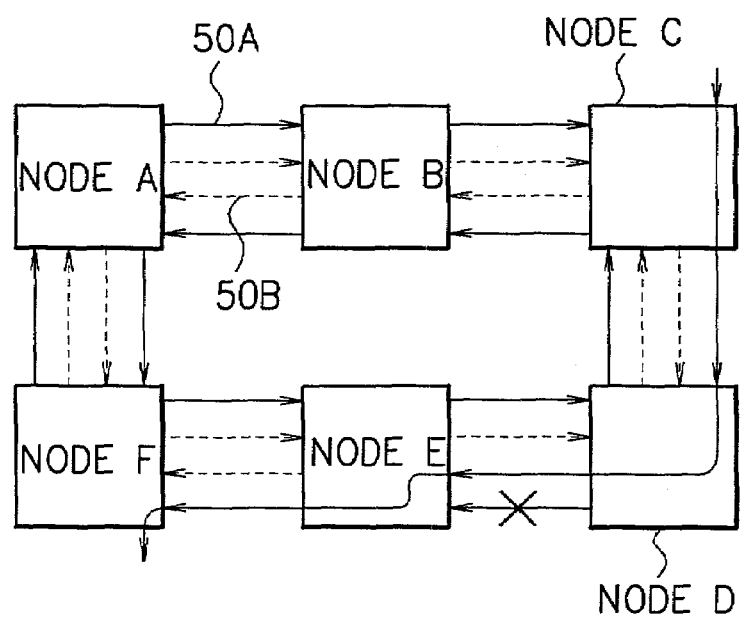
FIG. 3 is a schematic diagram showing another example of the layer 1 protection process (span switch process)
Figure 4:
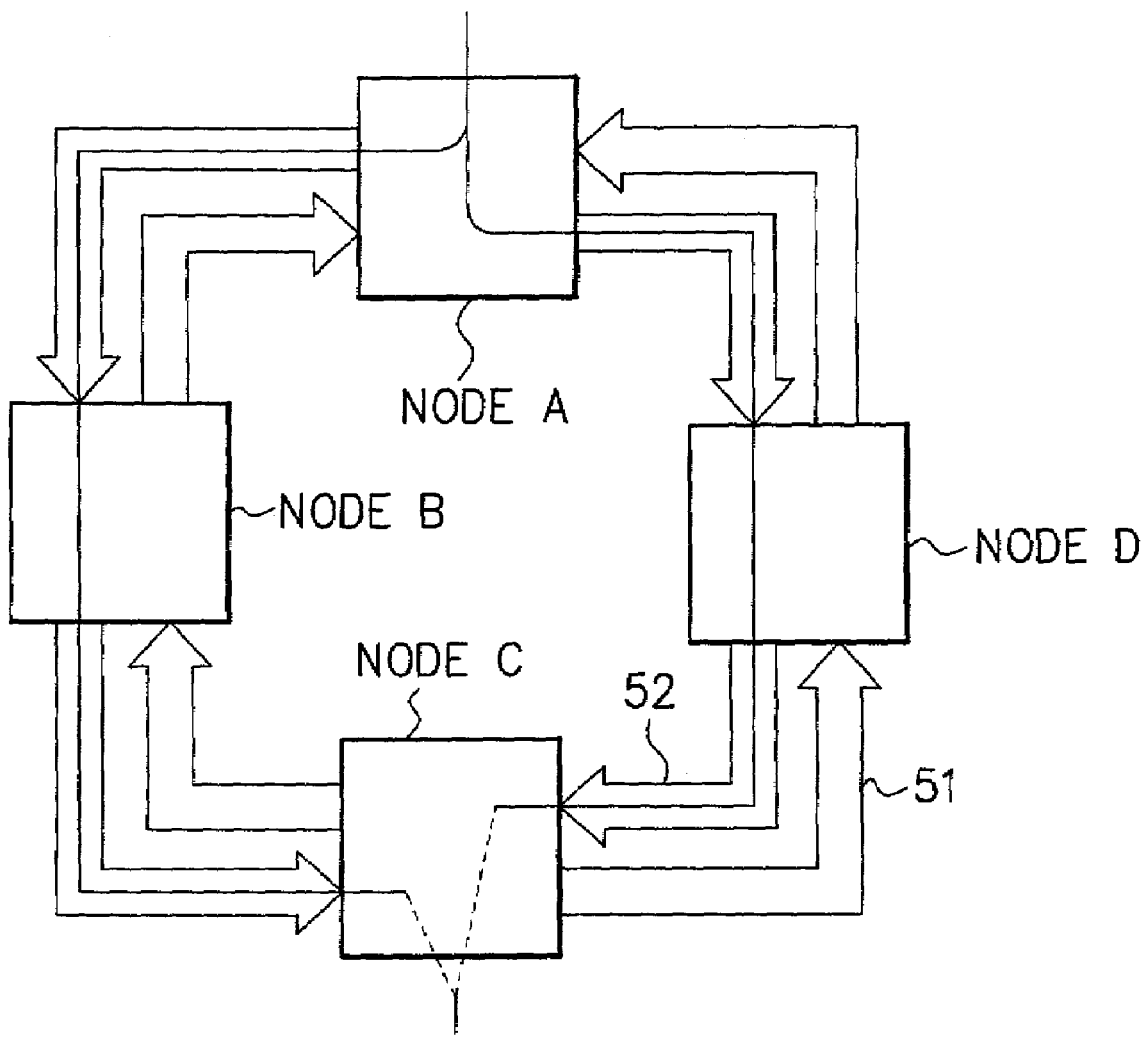
FIG. 4 is a schematic diagram showing an example of the operation of a UPSR network.

As has been explained referring to FIG. 3, the layer 1 switch 22 of the node 10-1 connects the port 1 of the layer 2 switch 32 with the protection channel (line 13) whose data transmission direction is the same as that of the aforementioned working channel (line 11), thereby data transmission to the node 10-4 is carried out using the protection channel (line 13) only. The layer 1 switch 22 of the node 10-4 receives the data from the protection channel.

In short, data transmission from the node 10-1 to the node 10-4 in the no failure state is executed using the lines 11 and 13 as a link-aggregated virtual channel, whereas in the failure state, data transmission to the node 10-4 is executed using a usable line (line 13 in this example). Therefore, the traffic that is passed through the protection channel in the no failure state can also be protected (as well as the traffic that is passed through the working channel in the no failure state), differently from the conventional ring network in which the extra traffic which is passed through the protection channel in the no failure state is abandoned in case of failure.

Incidentally, in other links where no span switch process is executed, data transmission can be conducted by means of the link aggregate process. It is also possible to carry out the span switch process in other links having no failure (aforementioned settings ③, ④, ⑤, etc.). In such cases, the link aggregate control section 31B of each node connects with paths that are established by the span switch process.

As mentioned before, even in the case where the failure point (failure line) can be avoided by means of the span switch process, the layer 1 switch 22 of the node adjacent to the failure line can also execute the turn-back process (ring switch process). In such cases, the link aggregate control section 31B of each node can carry out data transmission by operating as the above explanation on the ring switch process.

The layer 2 switch 32 has a plurality of ports and is connected with the link aggregate processing section 31 (link aggregate control section 31B) through the ports. The number of ports of the layer 2 switch 32 is set equal to the number of nodes that are directly connected with the node including the layer 2 switch 32 itself. In this embodiment, each node is directly connected with two nodes, therefore, the number of ports of the layer 2 switch 32 is set to 2 (ports 1, 2).

The layer 2 function block 30 is provided with an interface for the connection with an external terminal unit, as well as a plurality of ports for the connection with the layer 1 function block 20. The external terminal unit makes access to a link (network) through the layer 2 function block 30 and the layer 1 function block 20 and thereby communicates with another terminal unit that is connected with another node.

In the following, examples of ring network control in accordance with the embodiment of the present invention will be explained in detail with regard to the no failure state and the failure state.

<Control of Ring Network: No Failure State>

Each node 10 link-aggregates the working channel and the protection channel of the same data transmission direction and thereby transmits/receives the working traffic.

For example, the node 10-1 shown in FIG. 6 link-aggregates the line 11 (working channel) and the line 13 (protection channel) and thereby transmits data to the node 10-4. The node 10-1 also link-aggregates the line 12 (working channel) and the line 14 (protection channel) and thereby receives data from the node 10-4.

Concretely, the node 10-1 transmits first data and second data to the line 11 (working channel) and the line 13 (protection channel) respectively, and the node 10-4 receives the first data and the second data from the working channel and the protection channel respectively.

By the data transmission/reception by means of the link aggregation, the effective use of the bandwidth that has been used for the transmission of the extra traffic only in the no failure state (protection channel) can be made.

The link aggregate control section 31B does not let the upper layer (layers 3 to 7 of the OSI 7-layer model) be aware that the number of its transmitting ports and the number of its receiving ports are both plural (ports 1-1-1-4 and 2-1-2-4). For example, the link aggregate control section 31B provides the upper layer with only one logic port for the data transmission to the node 10-4.

Concretely, the upper layer sends data to be transmitted to the node 10-4 to the logic port, and the link aggregate control section 31B transmits the data to the node 10-4 using the port 1-1 and/or the port 1-2. Meanwhile, data supplied to the node 10-1 via the lines 15 and 17 are inputted to the ports 2-3 and 2-4 of the link aggregate control section 31B. The link aggregate control section 31B aggregates the input data and inputs the aggregated data to the port 2 of the layer 2 switch 32.

<Control of Ring Network: Failure State #1>

First, an example of the control of the ring network in the case of the ring switch process for avoiding the links 1 and 5 will be explained.

The nodes 10-1 and 10-4 which are adjacent to the links 1 and 5 connect the working channels with the protection channels so as to avoid the failure point (links 1 and 5). Concretely, the node 10-1 is connected to the node 10-4 using the links 6-8 (protection channel).

The other nodes 10-2 and 10-3 ends the link aggregation process, and thereafter execute data transmission by being connected to the channels for the data transmission during the operation of the ring switch process. Incidentally, is also possible to let the node 10-1 and/or the node 10-4 send link aggregation suspension instructions to the other nodes 10-2 and 10-3.

The details of the operation of the node 10-1 are as follows. When the failure detection section 21 detected failure on the lines 11-14 (links 1 and 5), the failure detection section 21 informs the layer 1 switch 22 and the failure information section 31A of the layer 2 function block 30 about the state of the failure (failure information).

The layer 1 switch 22 determines which type of layer 1 protection process should be executed (which type of network should be established) based on the failure information. The types of the layer 1 protection processes (ring switch process, span switch process, etc.) to be employed may be predetermined properly for each failure information, as mentioned before. Negotiations on the type of the layer 1 protection process to be executed can also be carried out with the other node 10-4 adjacent to the failure point. It Is also possible to let the failure detection section 21 make the determination. After the type is determined, the layer 1 protection process of the type is carried out. In this example, the turn-back process is carried out using the lines 15-18 avoiding the failure point (lines 11-14) for the ring switch process. Concretely, the output from the port 1 of the layer 2 switch 32 is transmitted from the output protection channel (line 18), and the input to the port 1 of the layer 2 switch 32 is received from the input protection channel (line 17).

On receiving the failure information, the failure information section 31A instructs the link aggregate control section 31B to suspend the link aggregation process and connect the upper layer with the lines to be used for data transmission in the layer 1 protection process (port selection instruction). The link aggregation suspension instruction can also be sent to the other nodes 10-2 and 10-3.

The link aggregate control section 31B connects the port 1 of the layer 2 switch 32 with the port 1-1 (to be used after the ring protection) and connects the port 2 of the layer 2 switch 32 with the port 1-3 (to be used after the ring protection), as shown in FIG. 5.

In this example, the node 10-1 in, the protection process communicates with the node 1-2 using the link 2 (lines 15 and 16) and communicates with the node 1-4 using the link 6 (lines 17 and 18).

Therefore, the link aggregate control section 31B connects the port 1 of the layer 2 switch 32 (for the data transmission with the node 10-4) to its port 1-1 so as to be connected to the line 18 (for the data transmission to the node 10-4), and disconnects the line 13 (for the data transmission to the node 10-4) that became unusable by closing the port 1-2. Similarly, the link aggregate control section 31B connects the port 1 of the layer 2 switch 32 (for the data reception from the node 10-4) to its port 1-3 so as to be connected to the line 17 (for the data reception from the node 10-4) for realizing data reception from the node 10-4, and disconnects the line 14 (for the data reception from the node 10-4) that became unusable by closing the port 1-4.

The line 18 is used exclusively by the port 1 for the data transmission to the node 10-4, therefore, the connection between the port 2 and the port 2-1 is disconnected. Similarly, the connection between the port 2 and the port 2-3 is also disconnected.

After the setting by the link aggregate control section 31B is finished, communication is carried out using the usable ports.

The node 10-4 (the other node adjacent to the failure link) also carries out the turn-back process (ring switch process) for avoiding the failure link, similarly to the node 10-1.

The nodes 10-2 and 10-3 (which are not adjacent to the failure link) suspends the link aggregation process while the ring switch process is carried out in the network. The judgment on whether the layer 1 protection process is being executed or not can be made by means of well known methods. For example, the failure information section 31A of the node 10-1 and/or 10-4 adjacent to the failure link may send link aggregation suspension instructions to the nodes 10-2 and 10-3 when the layer 1 protection process is carried out, as mentioned before. The link aggregate control sections 31B of the nodes 10-2 and 10-3 receive the link aggregation suspension instructions and thereby suspend the link aggregation process and connect the upper layers with the lines to be used during the ring switch process.

When the network recovered from the failure, the nodes 10 finish the ring protection process and thereafter restarts the link aggregation process.

Concretely, when the recovery of the network from the failure is detected, the failure detection section 21 of each node informs the failure information section 31A about the recovery (failure recovery information). The failure information section 31A instructs the link aggregate control section 31B to carry out the link aggregation process (port selection instruction). The link aggregate control section 31B which received the port selection instruction carries out the link aggregation process as explained before.

<Control of Ring Network: Failure State #2>

Next, an example of the control of the ring network in the case of the span switch process for the link 1 shown in FIG. 5 will be explained.

In this case, each failure detection section 21 of the nodes 10-1 and 10-4 adjacent to the failure point (link 1) detects the link failure of the link 1 and informs the layer 1 switch 22 and the failure information section 31A about the failure (failure information). The layer 1 switch 22 which received the failure information generates a path using a channel (line) having no failure. Therefore, if the failure occurred to the working channel, a path using the protection channel is generated. If the failure occurred to the protection channel, a path using the working channel is generated.

The failure information section 31A instructs the link aggregate control section 31B to suspend the link aggregation process containing the failure line and carry out data transmission using the lines (channels) that are usable during the span switch process. Therefore, the link aggregate control section 31B stops the link aggregation process and carries out data transmission using the other channel in the same data transmission direction as the failure channel.

In the case where the aforementioned settings (for executing the span switch process not only for the failure link but also for other links) have been made, the span switch process is also executed for the links, that is, the link aggregation process on the links is suspended and thereafter data transmission is carried out using one of the two channels (lines). Which channel should be used during the span switch process can be predetermined, or can be determined by negotiations between the link aggregate control sections 31B of two nodes directly connected to the link.

As described above, in the ring network in accordance with the first embodiment of the present invention, working traffic can be transmitted using both the working channel and the protection channel when no failure exists in the network, and when failure occurred, protection of the working traffic in conjunction with the link aggregation function can be carried out.

Further, at the layer 1 level of the ring network, there is no need to be aware of the processes (link aggregation processes/protection processes) executed by the layer 2 function block 30, that is, the layer 1 level (layer 1 function blocks 20 and links) is required only to execute the layer 1 processes (including the layer 1 protection processes) as in conventional ring networks. Therefore, the ring network of the first embodiment can be implemented only by employing the layer 2 function blocks 30 in nodes of conventional ring networks.

Embodiment 2

While BLSR was employed in the ring network of the first embodiment, UPSR can also be employed as the layer 1 protection function in the ring network in accordance with the present invention.

Figure 10:
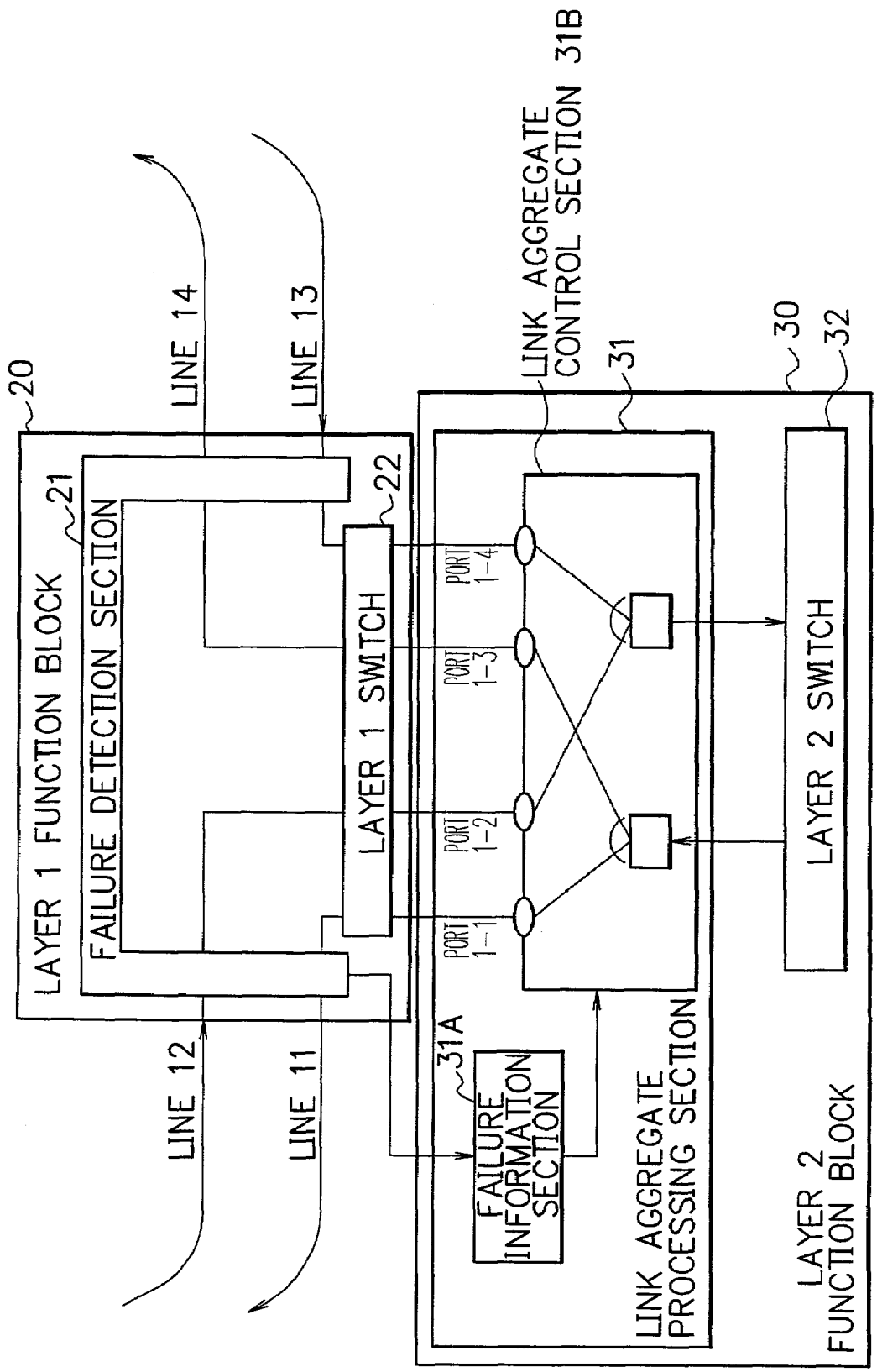
FIG. 10 is a block diagram showing an example of the composition of a node of a ring network in accordance with a second embodiment of the present invention.

FIG. 10 is a block diagram showing an example of the composition of the node 10 (10-1) of the ring network of the second embodiment. The lines 11, 12, 13 and 14 shown in FIG. 10 correspond to the links 1, 5, 2 and 6 of the ring network of FIG. 5, respectively. In the second embodiment, the links 1 and 5 are used as the working channels and the links 2, 3, 4, 6, 7 and 8 are used as the protection channels, for example.

Figure 11:
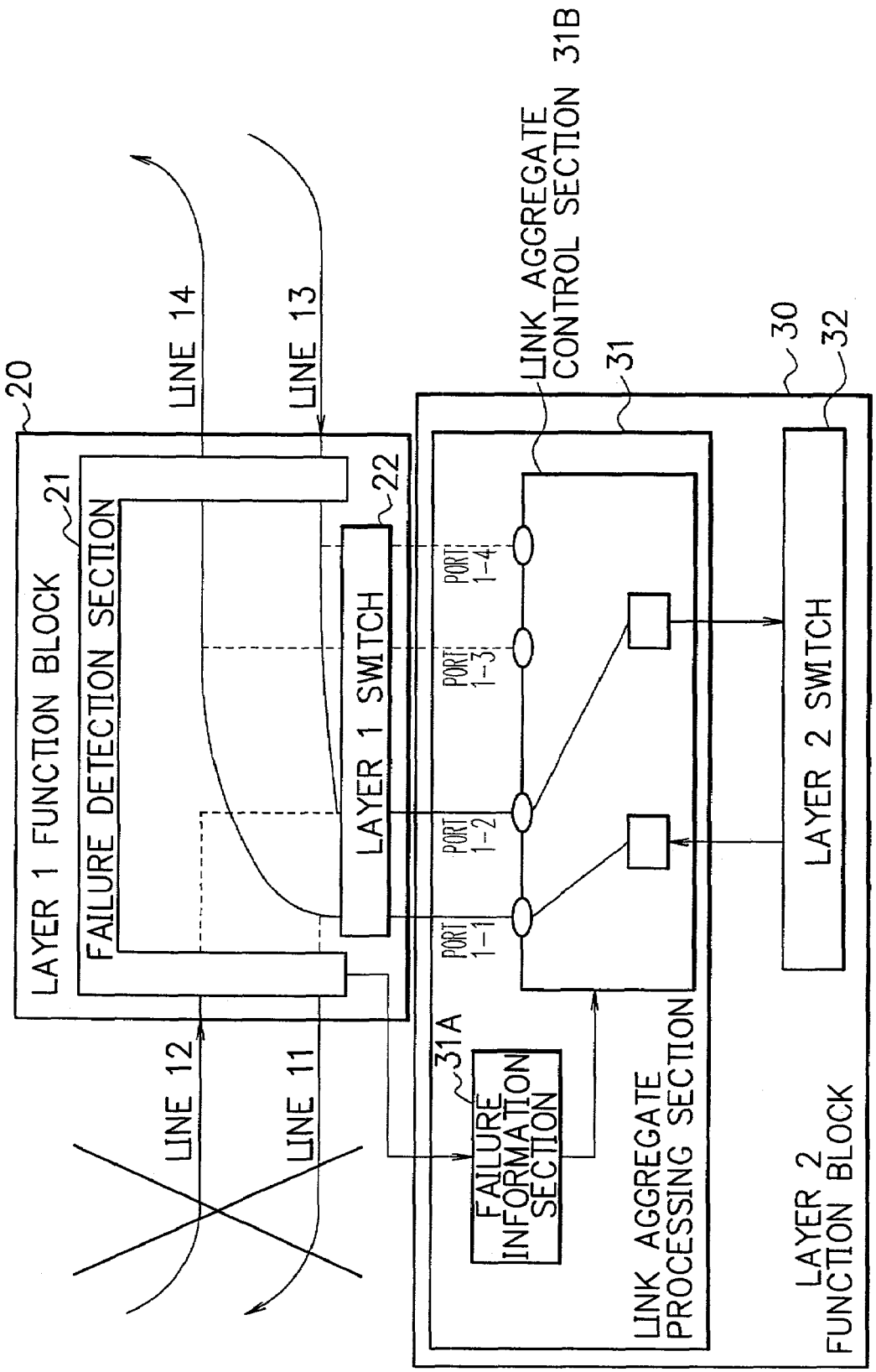
FIG. 11 is a schematic diagram showing the operation of the node of FIG. 10 when failure occurred to lines connected to the node.

As shown in FIG. 10, when no failure exists, the link aggregate control section 31B aggregates the ports 1-1 and 1-3 and the ports 1-2 and 1-4 respectively. When failure has occurred, the link aggregate control section 31B uses the ports 1-1 and 1-2 (that should be used during the ring protection process), and the layer 1 switch 22 connects the ports 1-1 and 1-2 to the lines 14 and 13 respectively, according to the ordinary layer 1 protection process (as shown in FIG. 11). In this example, only the lines 13 and 14 are usable as shown in FIG. 11, therefore, the ports 1-1 and 1-2 are selected.

In other words, when no failure exists, the link aggregate control section 31B of the data transmitting node link-aggregates the working channel and the protection channel similarly to the first embodiment. When failure occurred, the traffic is transmitted to a channel (path) having no failure.

The layer 1 function block 20 of the data receiving node in the no failure state receives the data from both the working channel and the protection channel. When failure has occurred, the link aggregate control section 31B receives the data from a channel (path) having no failure.

As for data transmission from the node 10-1 to the node 10-4, when no failure exists, the node 10-1 link-aggregates the working channel (line 11, link 1) and the protection channel (line 14, link 6) (for the data transmission to the node 10-4) and thereby transmits the data using both channels. When failure has occurred, a channel (path) having no failure is selected from the working channel and the protection channel for the data transmission to the node 10-4, and the data is transmitted by use of the selected channel (path) having no failure.

When no failure exists, the node 10-4 link-aggregates the working channel and the protection channel (for the data reception from the node 10-1) and thereby receives the data, that is, receives data from both the working channel and the protection channel. When failure has occurred, the node 10-4 receives the data by use of a channel (path) having no failure that is selected from the working channel and the protection channel for the data reception from the node 10-1.

Embodiment 3

While the 4-fiber ring has been employed in the first embodiment, the present invention can also be applied to 2-fiber rings. Therefore, the third embodiment of the present invention implements the first embodiment by the 2-fiber ring. Therefore, in the third embodiment, each link shown in FIG. 5 is implemented by a fiber cable. In this case, the link 1 (shown in FIG. 5) corresponds to the lines 11 and 13 (shown in FIG. 6), the link 2 corresponds to the lines 15 and 17, the link 5 corresponds to the lines 12 and 14, and the link 6 corresponds to the lines 16 and 18.

As set forth hereinabove, by the ring network, node, layer 2 function block and protection system in accordance with the present invention, working traffic can be transmitted using both the working channel and the protection channel when no failure exists in the network, and when failure occurred, protection of the working channel in conjunction with the link aggregation function can be carried out.

Therefore, a bandwidth (transmission capacity) of twice as large as that in conventional ring networks (that simply hand over the working traffic from the working channel to the protection channel when failure occurred) can be ensured when no failure exists in the network. Even when failure occurred, the same bandwidth as the conventional bandwidth can be guaranteed.

Further, the ring networks in accordance with the present invention can easily be implemented by applying standardized specifications (IEEE 802.3ad, etc.) to the conventional SDH/SONET rings and operating the ring networks as described above.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention. For example, the protection channel can also be designed to be capable of transmitting the extra traffic as in the conventional ring networks.

What is claimed is:

1. A layer 2 function block for being installed in each node of a ring network having a plurality of nodes connected by a working channel and a protection channel, wherein:
   the layer 2 function block carries out the transmission of working traffic using both the working channel and the protection channel when no failure exists in the network, and
   the layer 2 function block carries out, the transmission of the working traffic using a path avoiding a point of failure that is established by means of layer 1 protection process when the failure occurred in the network, and
   said layer 2 function block includes:
   failure information means for receiving failure information indicating the state of failure occurring in the network and failure recovery information indicating the recovery of the network from the failure from the layer 1 and issuing port selection instructions based on the failure information and the failure recovery information; and
   layer 2 connection control means for controlling the connections between the layer 1 and upper layers by controlling its ports based on the port selection instruction supplied from the failure information means.

2. A layer 2 function block as claimed in claim 1, wherein the layer 1 protection process includes ring switch process and span switch process.

3. A layer 2 function block for being installed in each node of a ring network having a plurality of nodes connected by a working channel and a protection channel, wherein:
   the layer 2 function block carries out the transmission of working traffic using a virtual channel generated by link-aggregating the working channel and the protection channel when no failure exists in the network, and
   the layer 2 function block carries out the transmission of the working traffic using a path avoiding a point of failure that is established by means of layer 1 protection process when the failure occurred in the network, and
   said layer 2 function block includes:
   failure information means for receiving failure information indicating the state of failure occurring in the network and failure recovery information indicating the recovery of the network from the failure from the layer 1 and issuing port selection instructions based on the failure information and the failure recovery information; and
   layer 2 connection control means for controlling the connections between the layer 1 and upper layers by controlling its ports based on the port selection instruction supplied from the failure information means.

4. A layer 2 function block as claimed in claim 3, wherein the layer 1 protection process includes ring switch process and span switch process.

5. A layer 2 function block as claimed in claim 3, wherein the layer 2 function block carries out the link aggregation of the working channel and the protection channel according to a link aggregation method defined by IEEE 802.3ad.

6. A node of a ring network having a plurality of nodes connected by a working channel and a protection channel, comprising
   a layer 1 function block for carrying out layer 1 protection process when failure occurred in the network and thereby establishing a path avoiding a point of the failure; and
   a layer 2 function block for carrying out the transmission of working traffic using both the working channel and the protection channel when no failure exists in the network, while carrying out the transmission of the working traffic using the path established by the layer 1 function block when the failure occurred in the network,
   said layer 2 function block includes:
   failure information means for receiving failure information indicating the state of failure occurring in the network and failure recovery information indicating the recovery of the network from the failure from the layer 1 function block and issuing port selection instructions based on the failure information and the failure recovery information; and layer 2 connection control means for controlling the connections between the layer 1 function block and upper layers by controlling its ports based on the port selection instruction supplied from the failure information means.

7. A node as claimed in claim 6, wherein the layer 1 protection process executed by the layer 1 function block includes ring switch process and span switch process.

8. A node of a ring network having a plurality of nodes connected by a working channel and a protection channel, comprising:

a layer 1 function block for carrying out layer 1 protection process when failure occurred in the network and thereby establishing a path avoiding a point of the failure; and a layer 2 function block for carrying out the transmission of working traffic using a virtual channel generated by link-aggregating the working channel and the protection channel when no failure exists in the network, while carrying out the transmission of the working traffic using the path established by the layer 1 function block when the failure occurred in the network, said layer 2 function block includes:

failure information means for receiving failure information indicating the state of failure occurring in the network and failure recovery information indicating the recovery of the network from the failure from the layer 1 function block and issuing port selection instructions based on the failure information and the failure recovery information and layer 2 connection control means for controlling the connections between the layer 1 function block and upper layers by controlling its ports based on the port selection instruction supplied from the failure information means.

9. A node as claimed in claim 8, wherein the layer 1 protection process executed by the layer 1 function block includes ring switch process and span switch process.

10. A node as claimed in claim 8, wherein the layer 2 function block carries out the link aggregation of the working channel and the protection channel according to a link aggregation method defined by IEEE 802.3ad.

11. A ring network comprising a plurality of nodes connected by a working channel and a protection channel, wherein the nodes includes:

a layer 1 function block for carrying out layer 1 protection process when failure occurred in the network and thereby establishing a path avoiding a point of the failure; and a layer 2 function block for carrying out the transmission of working traffic using, both the working channel and the protection channel when no failure exists in the network, while carrying out the transmission of the working traffic using the pat established byte layer 1 function block when the failure occurred in the network, said layer 2 function block includes:

information means for receiving failure information indicating the state of failure occurring in the network and failure recovery information indicating the recovery of the network from the failure from the layer 1 function block and issuing port selection instructions based on the failure information and the failure recovery information; and layer 2 connection control means for controlling the connections between the layer 1 function block and upper layers by controlling its ports based on the port selection instruction supplied from the failure information means.

12. The ring network as claimed in claim 11, wherein the layer 1 protection process executed by the layer 1 function block includes ring switch process and span switch process.

13. A ring network comprising a plurality of nodes connected by a working channel and a protection channel, wherein the nodes includes:

a layer 1 function block for carrying out layer 1 protection process when failure occurred in the network and thereby establishing a path avoiding a point of the failure; and a layer 2 function block for carrying out the transmission of working traffic using a virtual channel generated by link-aggregating the working channel and the protection channel when no failure exists in the network, while carrying out the transmission of the working traffic using the path established by the layer 1 function block when the failure occurred in the network, said layer 2 function block includes:

failure information means for receiving failure information indicating the state of failure occurring in the network and failure recovery information indicating the recovery of the network from the failure from the layer 1 function block and issuing port selection instructions based on the failure information and the failure recovery information; and layer 2 connection control means for controlling the connections between the layer 1 function block and upper layers by controlling its ports based on the port selection instruction supplied from the failure information means.

14. The ring network as claimed in claim 13, wherein the layer 1 protection process executed by the layer 1 function block includes ring switch process and span switch process.

15. The ring network as claimed in claim 13, wherein the layer 2 function block carries out the link aggregation of the working channel and the protection channel according to a link aggregation method defined by IEEE 802.3ad.

16. A ring network node comprising:

a layer 1 function block, including a failure detection section that detects a failure in a network and a switch, when a failure is detected, said layer 1 function block causes said switch to be actuated to carry out layer 1 protection process, thereby establishing a path to avoid a point of failure; and a layer 2 function block including a link aggregate control section for generating a virtual channel using link aggregation of a working channel and a protection channel, when no failure is detected by said failure detection section, transmission of working traffic uses the virtual channel created by the link aggregated control section, when a failure is detected by said failure detection section, said link aggregate control section suspends said link aggregation and causes a second switch to be actuated to carry out transmission of the working traffic using paths established by layer 1 protection process.

* * * * *